(No Model.)
W. H. CURTIS.
DUST COLLECTOR.
No. 420,296. Patented Jan. 28, 1890.
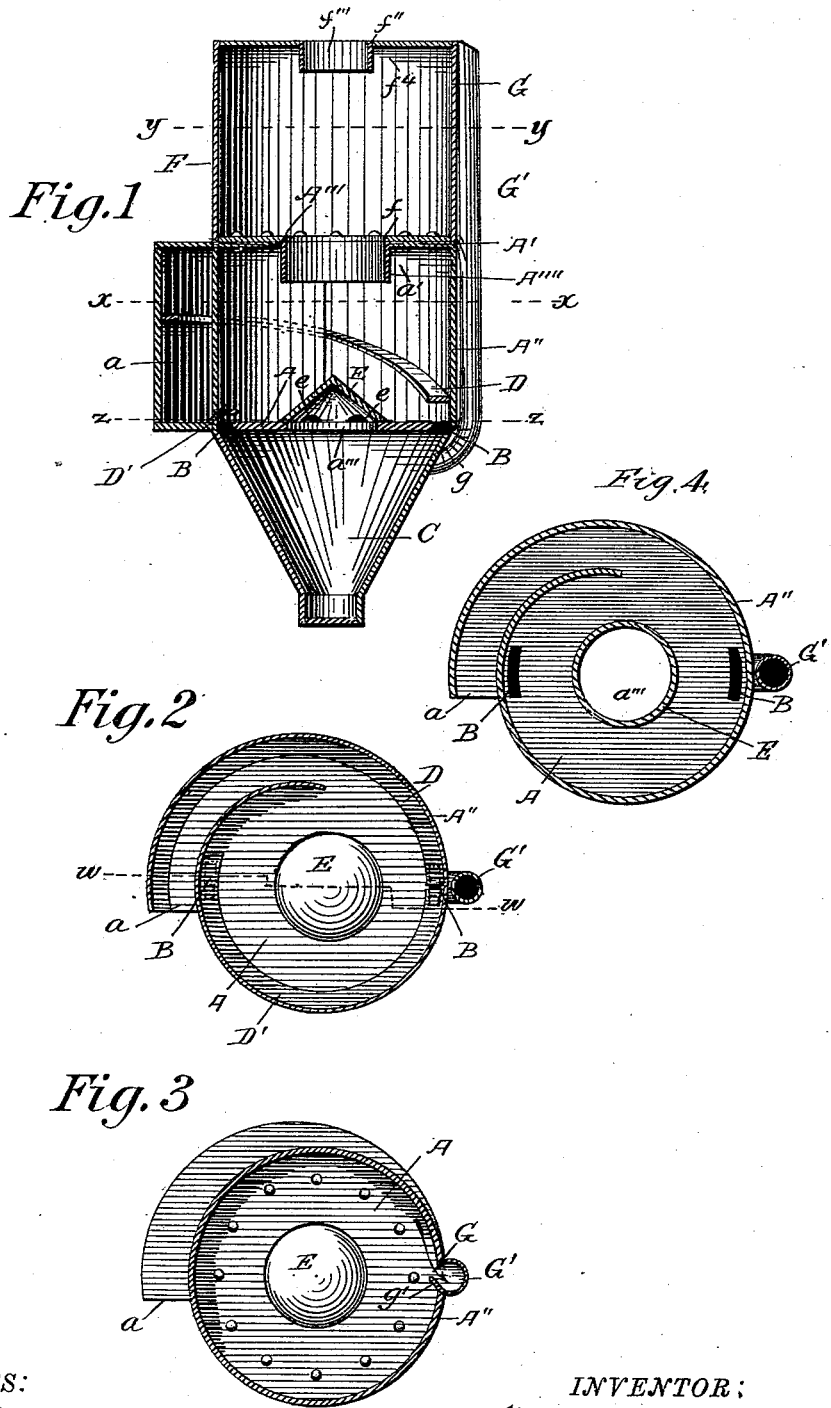
WITNESSES:
J. R. Stuard
Parker W. Sweet Jr.
INVENTOR:
William H. Curtis;
By Marble + Mason,
Attorneys

UNITED STATES PATENT OFFICE.

WILLIAM H. CURTIS, OF EAST SAGINAW, MICHIGAN.

DUST-COLLECTOR.

SPECIFICATION forming part of Letters Patent No. 420,296, dated January 28, 1890.

Application filed January 27, 1888. Serial No. 262,139. (No model.)

*To all whom it may concern:*

Be it known that I, WILLIAM H. CURTIS, a citizen of the United States, residing at East Saginaw, in the county of Saginaw and State of Michigan, have invented certain new and useful Improvements in Dust-Collectors; and I do hereby declare the following to be a full, clear, and exact description of the invention, such as will enable others skilled in the art to which it appertains to make and use the same.

This invention relates to improvements in the class of machines which are employed in mills, factories, &c., for freeing the air from the dust, shavings, or other solid particles contained therein, and in which the dust-laden air receives a rapid rotative or whirling motion in the separating-chamber, whereby the dust or solid particles are driven out of the air-current and against the inner surface of the chamber by centrifugal force; and it consists in the construction and arrangement or combination of parts hereinafter disclosed in the description, drawings, and claims.

The object of my invention is to produce a machine which will effect a perfect separation of the air and fine dust from the coarser dust, shavings, or other material, and also the fine dust from the air, and effectually dispose of the same, and which will be simple in construction, compact, and easily understood and operated.

In my invention the dust-laden air is delivered tangentially into the separating-chamber, and the dust particles are thrown against and precipitated by the inner surface of an imperforate casing, which forms the inclosure of said separating-chamber, and are forced downward to dust-discharge openings in the bottom of said separating-chamber by means of inclined shelves. The dust particles are discharged into a hopper arranged on the under side of the separating-chamber and the air in the hopper passes back into said separating-chamber. In the top of said separating-chamber is formed a circular discharge-opening for the escape of the air, which is usually laden with more or less fine dust. Above this opening, communicating therewith and attached to the upper end of the separating-chamber proper, is a supplemental inclosure or chamber, which receives the rotating air and fine dust as they are delivered from the lower or main separating-chamber, and continues the whirling or rotating motion thereof for the purpose of further separating and saving said fine dust and permitting the air to escape in a purified condition.

In the accompanying drawings, forming part of this specification, wherein the same reference-letters indicate the same parts, Figure 1 represents a central vertical section of my improved dust-collector, the section of the separating-chamber being taken on the irregular line *w w* of Fig. 2; Fig. 2, a horizontal section on the line *x x* of Fig. 1; Fig. 3, a horizontal section on the line *y y*, and Fig. 4 a horizontal section on line *z z* of same figure.

The separating-chamber is constructed of a bottom A, a top A', and a casing A'', provided with an external tangential inlet-spout *a*. The top is formed with a circular discharge-opening A''', leading upward from the central portion of the chamber, and within this opening is secured a short pipe A'''', which extends downward into the central portion of said chamber, and forms a dust-retaining or retarding space *a'* between the same and the inner surface of the upper portion of the casing.

In the bottom A of the separating-chamber are formed openings B B, for the discharge of the heavier dust into the hopper C, said openings being elongated in form, so that the exit therethrough of the heavier particles will not all occur at one point, and thus choking or filling up of said openings will be entirely avoided.

To the inner surface of the casing of the separating-chamber are secured downwardly-inclined shelves or deflectors D D', which extend from points between the top and bottom of the separating-chamber to points a short distance above and beyond the elongated openings B B, as shown. The bottom A is also formed with a central opening *a'''* in communication with the central portion of the chamber and the hopper. This opening is covered with a cone E, which at its base is supplied with openings *e e*, for forming communication between the hopper and the cen- (No Model.)
G. W. GARDNER.
IRONING BOARD.
No. 420,297. Patented Jan. 28, 1890.
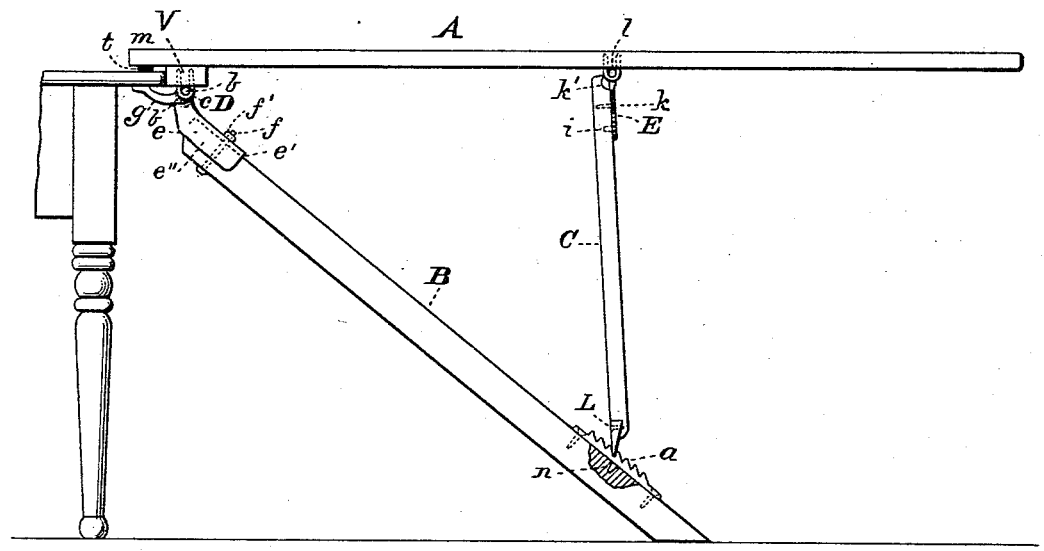
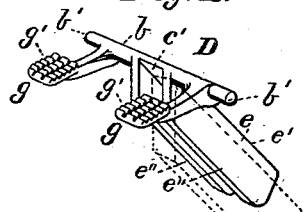
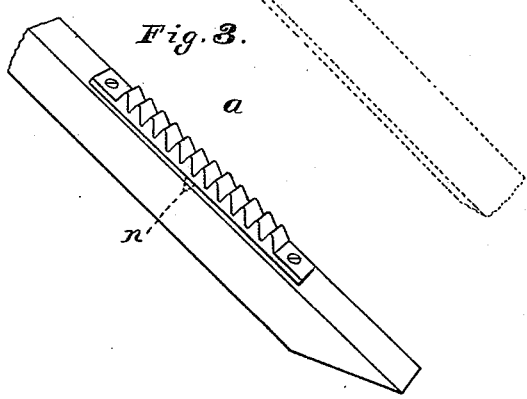
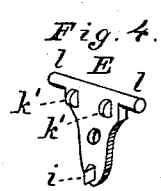
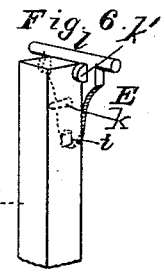
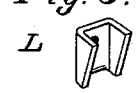
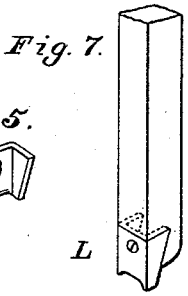
WITNESSES
Villette Anderson,
J. W. Anderson
INVENTOR
Geo. W. Gardner
by E. W. Anderson
his Attorney